(12) United States Patent
Brewington

(10) Patent No.: US 7,464,668 B2
(45) Date of Patent: *Dec. 16, 2008

(54) PET DIAPER GARMENT

(76) Inventor: Dana Brewington, 2332 Ashboro Dr., Chevy Chase, MD (US) 20815

( * ) Notice: Subject to any disclaimer, the term of this patent is extended or adjusted under 35 U.S.C. 154(b) by 283 days.

This patent is subject to a terminal disclaimer.

(21) Appl. No.: 11/265,795

(22) Filed: Nov. 1, 2005

(65) Prior Publication Data

US 2006/0096551 A1 May 11, 2006

Related U.S. Application Data

(63) Continuation-in-part of application No. PCT/US2004/011994, filed on Apr. 16, 2004.

(51) Int. Cl.
*A01K 23/00* (2006.01)
(52) U.S. Cl. ...................................... 119/869; 119/850

(58) Field of Classification Search .............. 119/850, 119/869, 868, 856; 604/385.09, 385.19, 604/385.11, 393; 54/79.1, 79.2, 79.4; D30/144, D30/145
See application file for complete search history.

(56) References Cited

U.S. PATENT DOCUMENTS

| | | | | |
|---|---|---|---|---|
| 4,842,596 A | * | 6/1989 | Kielpikowski et al. | 604/385.26 |
| 4,917,683 A | * | 4/1990 | Thompson | 604/387 |
| 5,954,015 A | * | 9/1999 | Ohta | 119/850 |
| 6,368,313 B1 | * | 4/2002 | Howard | 604/385.09 |
| 6,752,796 B2 | * | 6/2004 | Karami | 604/391 |

* cited by examiner

*Primary Examiner*—T. Nguyen
(74) *Attorney, Agent, or Firm*—Fitch, Even, Tabin & Flannery

(57) ABSTRACT

The present invention is directed to a pet diaper garment that includes an absorbent garment portion and a bib strap. The absorbent garment and bib strap may be customized to securely and comfortably fit an animal.

6 Claims, 14 Drawing Sheets

PET DIAPER GARMENT

The present application is a continuation-in-part application of PCT US04/011994, filed Apr. 16, 2004 and designating the U.S., which is incorporated herein by reference.

The present invention relates to a pet diaper garment. More particularly, the pet diaper garment includes a customizable tail opening, customizable leg openings, and a customizable bib strap that are effective for allowing the garment to be easily customized to securely and comfortably fit an animal.

BACKGROUND

As a result of advanced age or medical condition, pets, such as dogs and cats, may exhibit a permanent or temporary inability to control their waste discharges, particularly urinary discharges, leading to numerous and problematic "accidents" in the home, automobile, etc. The same situation can arise, whether in animal hospitals or later in the home, following particular forms of surgery performed on the pets. Accidents of this nature also are common in very young animals, particularly dogs, during their training period. Apart from such situations, there often exists other instances where a means for preventing accidents of this nature is desirable, such as for dogs left unattended for extended periods in the home, dogs owned by persons residing in apartments who cannot immediately access outdoor areas, dogs being taken into public places, and the like.

A number of pet diapers are available. However, these diapers tend to be very ineffective as they do not securely fit the animal. For example, when a pet diaper is applied to an animal having a small tail, the clearance between the tail and the tail opening tends to be too large. The clearance may allow solid and fluid waste to escape. Additionally, the leg openings of these diapers often do not securely fit around the animal's legs, thus creating gaps which may allow solid and fluid waste to escape. These diapers are also prone to leakage of liquid waste, particularly with male animals, because the core absorbent material does not extend to the diaper's waistband.

Often times a pet diaper forms gaps or even falls off the animal. Some diapers are secured to the animal with suspenders or belts. The suspenders may be uncomfortable or may not provide the desired secure fit because they do not always match the shape of the animal. Further, the suspenders may not always stay on the animal's shoulder and may tend to slip off. The pet diapers also are uncomfortable for the animal because the length of the diaper is too short to reach the animal's waist.

SUMMARY

The present invention is directed to a pet diaper garment for use with four legged domestic animals such as dogs or cats, or two legged animals, having incontinency problems due to age or illness. The diaper garment may also be used to prevent accidents which may occur when the animal is left alone for extended periods of time, when the animal is still being trained, for female dogs in heat and puppy training, and for preventing accidents while traveling and in public places. The pet diaper garment is also effective for use as a physical barrier for avoiding pregnancy. The garment is especially effective as it may be easily customized by the user to securely and comfortably fit onto the animal's torso.

The pet diaper includes an absorbent garment portion that encircles the animal's torso, and a bib strap that helps to secure the absorbent garment to the animal. The absorbent garment portion includes a back section having a core absorbent material covering a rear section of the animal, a front section having a core absorbent material covering an abdominal area of the animal, and stretchable side sections connecting the back and front sections to form a top section. The absorbent garment portion may also include an elastic waist band effective for securing the absorbent garment portion to the animal and customizable leg sleeves enabling the user to manually reduce the size of the leg openings.

The back section of the absorbent garment portion may include a tail panel that is effective for allowing a user to easily locate and create a customized tail opening at the base of the animal's tail. In one embodiment, the tail panel includes perforations to assist the user in creating the customized tail opening. The customizable tail opening accommodates the animal's tail, affords greater comfort to the animal, and reduces the risk that waste material will escape.

In one aspect of the invention, the absorbent garment portion may be formed as a single piece. In this aspect, the absorbent garment portion may be put onto the animal by inserting the animal's legs into leg openings and then pulling the absorbent garment around the animal's torso. A customized tail opening may be formed in the back section of the absorbent garment by manually opening the tail panel by cutting a hole in the tail panel or by opening the perforations in the back section which match the position and width of the animal's tail.

In another aspect of the invention, the absorbent garment portion may open along its top section where the stretchable side sections are joined. In this aspect, the absorbent garment portion may be put onto the animal by inserting the animal's legs into leg openings and then pulling the absorbent garment around the animal's torso and securing the side sections together to form a top section. The opening along the top section may be extended by opening perforations in the back section further such that the back and side sections can be closed to securely encircle the animal's tail.

The length of the pet diaper garment is important for the comfort of the animal and for protection against waste leakage. In an important aspect of the invention, the pet diaper garment reaches the waist of the animal. In this aspect the absorbent garment portion of the diaper has a width to length ratio of about 0.2 to about 0.35. Absorbent garments in this ratio provide excellent fit and waste containment characteristics for pets.

The pet diaper garment also includes a bib strap that helps to secure the absorbent garment to the animal. The bib strap includes a single strap section that is attached to the front section of the absorbent garment. The bib strap includes perforations that allow the strap to be separated into two sections. The two separated sections may extend around the animal's neck, forming a head opening and connect with the back section of the absorbent garment. In alternative aspects of the invention, the bib strap may separate to encircle the animal's neck area and then connect to the back section of the absorbent garment in two areas, or the bib strap may rejoin after encircling the animal's neck area and then connect to the back section of the absorbent garment. In another embodiment, the bib strap may include two separate straps that attach to the front and back sections of the absorbent garment and which extend around the animal's neck.

In another aspect of the invention, the shoulder straps of the bib strap may be secured on the animal to prevent the shoulder straps from falling off the shoulders of the animal by one or more connectors. Preferably, a connector secures the shoulder straps on the front or back torso of the animal. More preferably, one or more connectors secure the shoulder straps on the front torso of the animal and one or more connectors secure the shoulder straps on the back torso of the animal. The use of one or more connectors provides for a customizable bib strap that prevents the absorbent garment from falling off the animal, particularly when the absorbent garment becomes heavy with waste material.

The bib strap may be formed out of elastomeric nonwoven material to further help secure the absorbent garment portion to the animal. Elastomeric nonwoven material includes nonwoven materials combined with elasicts. In this aspect, the elastic nonwoven materials may have a stretch capacity of about 200 to about 350%.

The present invention also provides a method for containing waste discharges from pets. In accordance with the method, the absorbent garment of the invention is encircled around an animal's torso. A tail opening is located and created in the back section of the absorbent garment and the tail opening is positioned around the animal's tail. The absorbent garment is further secured to the animal with the bib strap. The bib strap may be separated into two sections and extended around the front and neck of the animal. The bib strap is then connected to the top section of the absorbent garment. The shoulder straps of the bib strap may be secured in place with one or more connectors.

DETAILED DESCRIPTION

The present invention provides a diaper garment for household pets that securely fits the pet body without causing discomfort to the pet and without being perceived by the pet as an annoyance. The secure fit is aided through the combination of the customizable tail opening in the absorbent garment, customizable leg openings, and customizable bib strap.

Absorbent Garment

Figure 1:
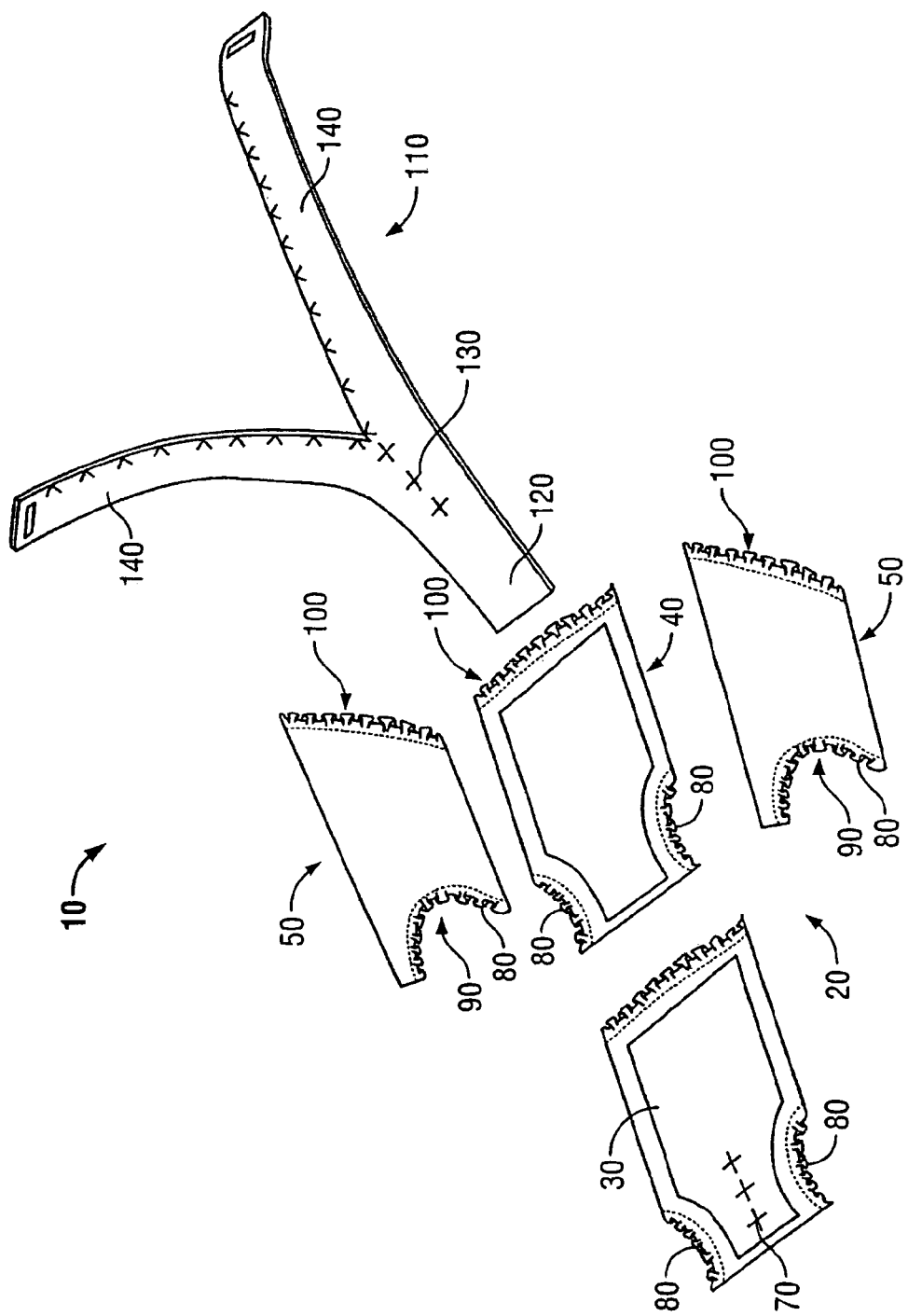
FIG. 1 shows component parts of the pet garment.
Figure 2:
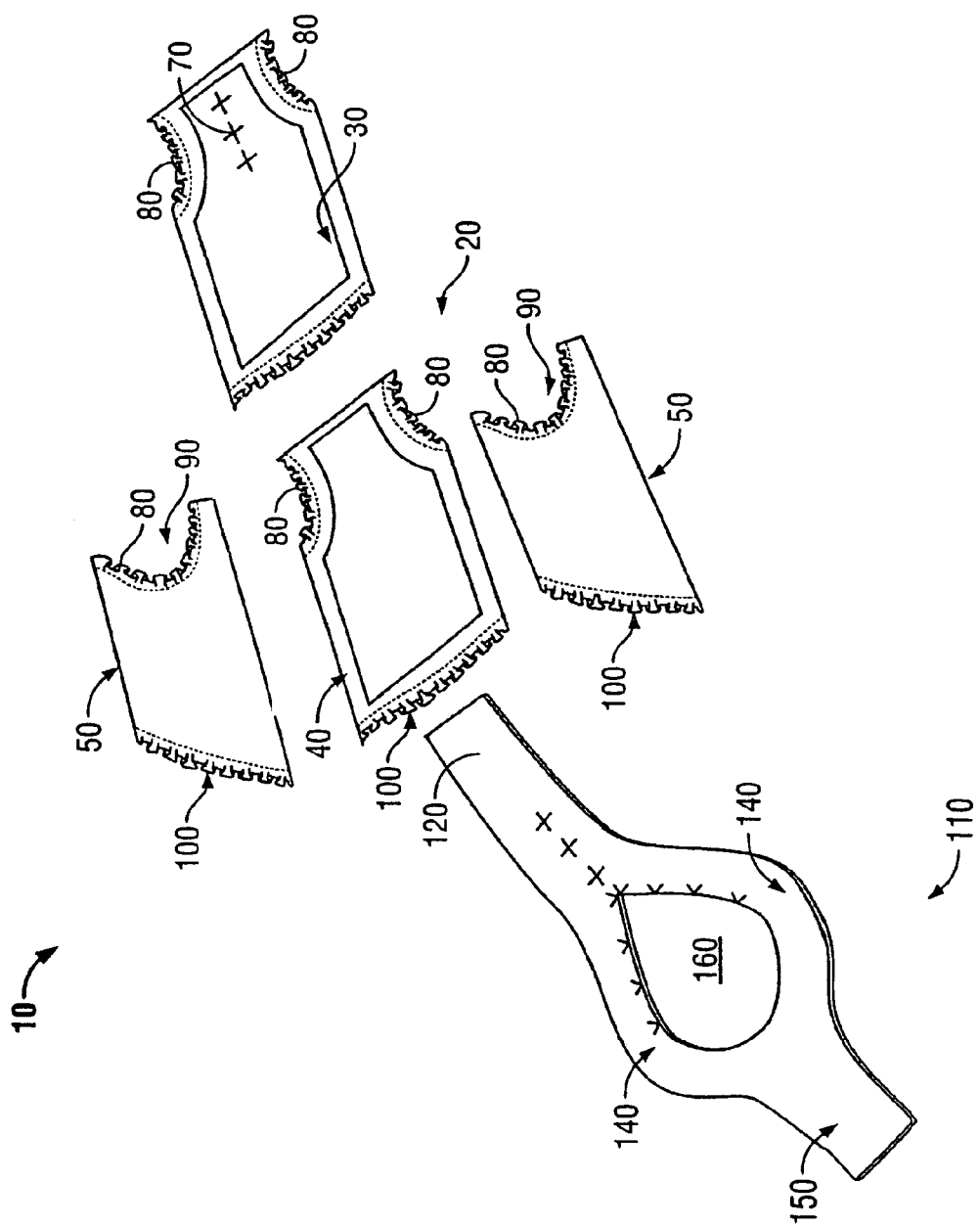
FIG. 2 shows component parts of the pet garment.
Figure 3:
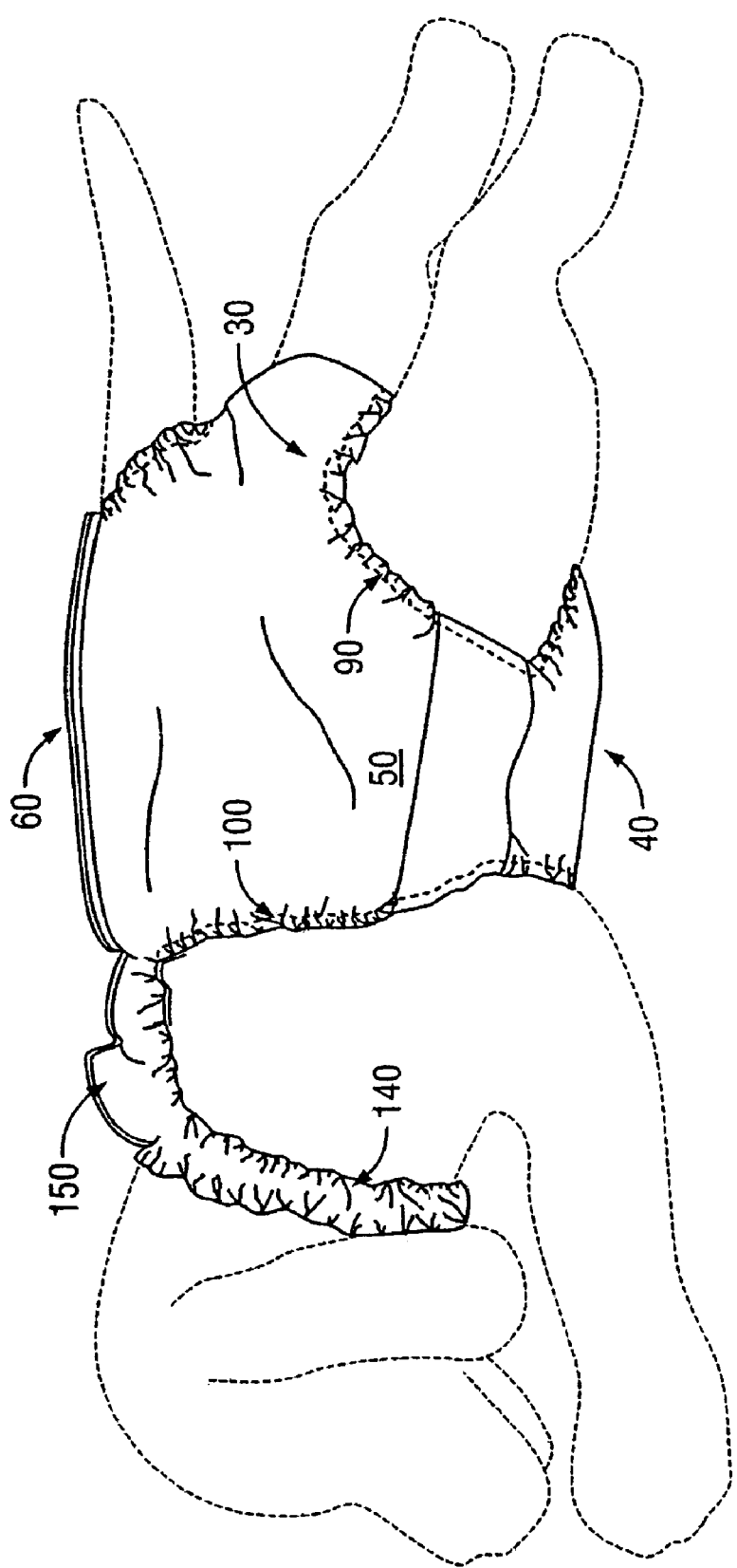
FIG. 3 is a side view of a dog wearing the pet garment.

As shown in FIGS. 1 and 2, the pet diaper garment 10 of the present invention includes an absorbent garment 20. The absorbent garment 20 includes a back section 30, a front section 40, and stretchable side sections 50 which join to form a top section 60 (shown in FIG. 3). The back section 30 may include tail panel perforations 70 which form the customizable tail opening. In one aspect, The absorbent garment 20 also includes leg openings 80 that may be defined at least in part by circumferentially disposed elastic material 90.

The absorbent garment 20 may also include an elastic waist band 100. In an important aspect, the absorbent garment 20 does not include a belt. As used herein, "no belt" means that the absorbent garment 20 does not include a waist band, elastic or otherwise, that is removable from the absorbent garment 20.

The back section 30 and front section 40 may be formed from an integral unitary material, or may be formed by attachment together of separate back 30 and front 40 sections which can be made of the same or different materials.

The absorbent garment 20 includes stretchable side sections 50 adapted to engage the flank areas of the animal. The side sections 50 can be separate components one from the other, and which are attached to respective edge areas of the back 30 and front 40 sections. The side sections 50 may be made of the same or different material used in making the back 30 and front sections 40. The side sections 50 are made of material having elasticity so as to permit a snug fit along the flanks of the animal while at the same time permitting appropriate expansion so as to not interfere with breathing or other normal body movements.

Figure 6:
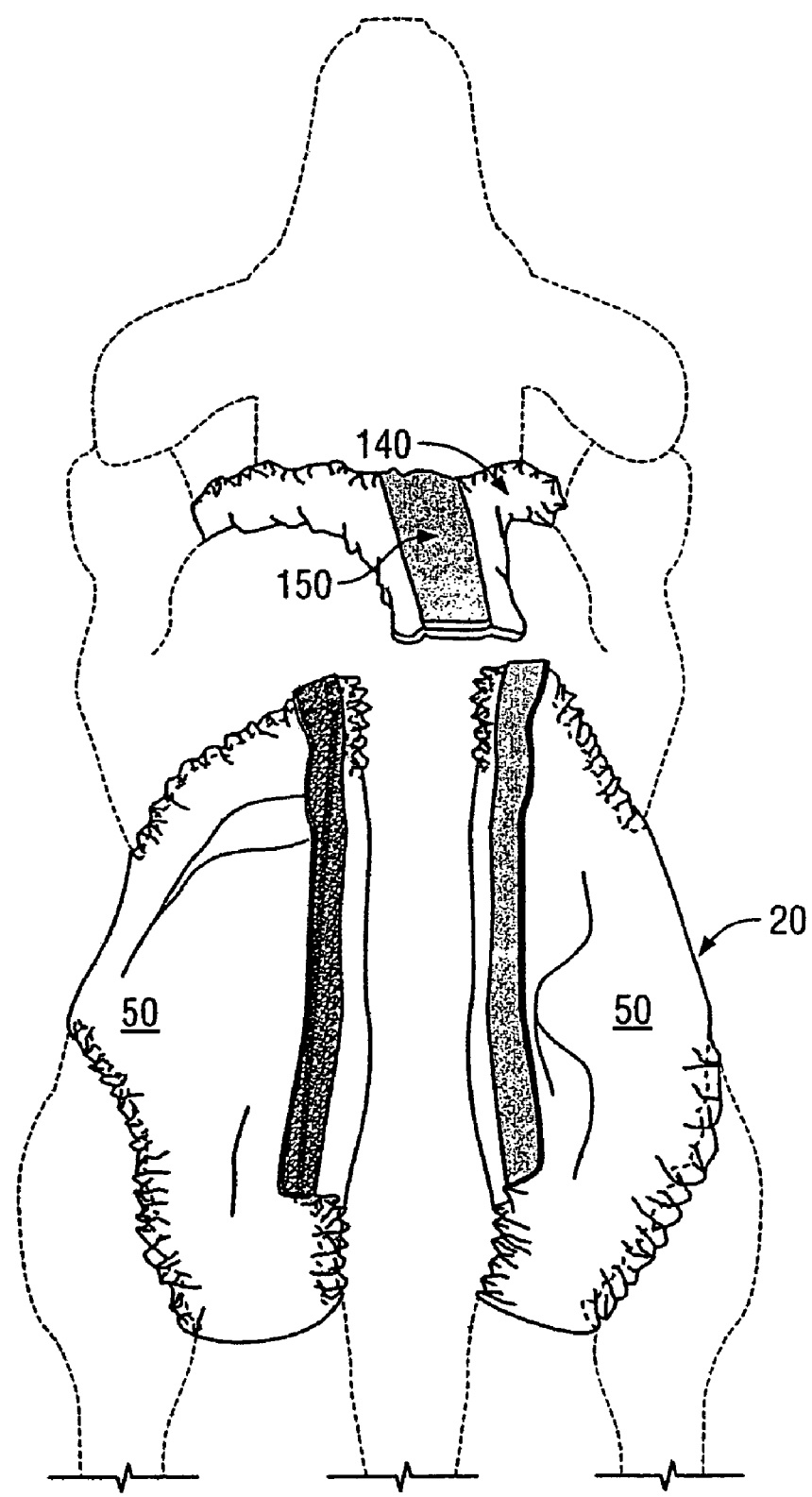
FIG. 6 is a top view of a dog wearing the pet garment.
Figure 10:
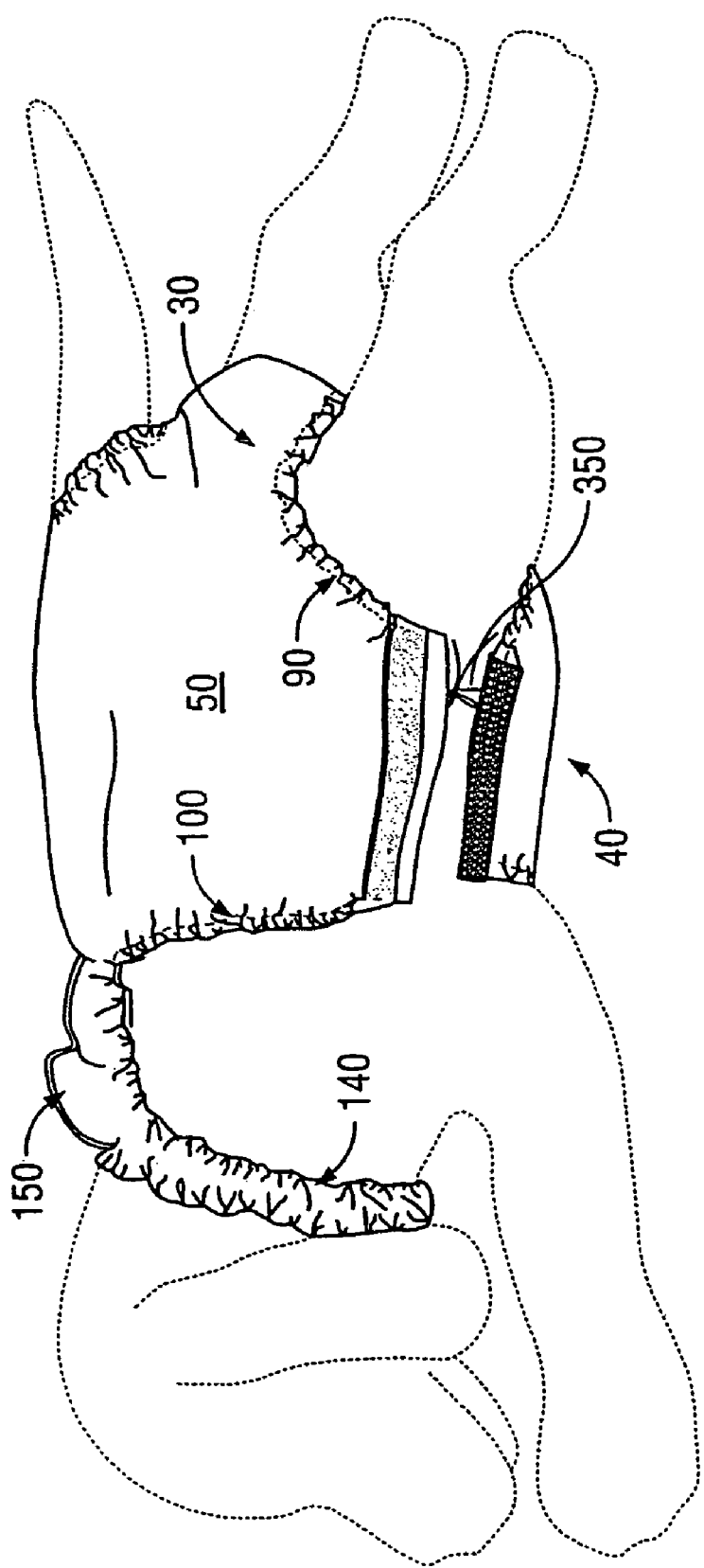
FIG. 10 is a side view of a dog wearing the pet garment with a side opening.

As shown in FIG. 6, the absorbent garment 20 may open along the back section. Side sections 50 may be joined by any connector known in the art, such as Velcro, to secure the absorbent garment to the animal and to provide a secured customized fit around the animal's tail. Alternatively, the absorbent garment 20 may open along a side section 50 at side opening 350 (shown in FIG. 10). Side opening 350 may be closed using any connector known in the art, such as Velcro.

The absorbent garment 20 includes a core absorbent material positioned on its inner face which is effective for absorbing liquid waste from the animal and for containing solid waste. In one aspect, a core absorbent material extends to about the front waist band 100 of the absorbent garment 20. The absorbent material will extend to at least and are around the tail opening or tail panel perforations 70 The absorbent garment 20 may include an inner permeable sheet made of nonwoven fabric, an outer waterproof sheet made of synthetic resin and absorbent pad located between the inner and outer sheets. The absorbent garment may be formed from known absorbent type materials used for disposable diapers. The absorbent materials have a capacity effective for containing the types and volumes of discharges known to occur in pets, especially dogs.

In one aspect of the invention, the absorbent garment 20 is completely detachable from the bib strap 110. Alternatively, the absorbent garment 20 may be permanently attached to the bib strap 110. In this aspect, the absorbent garment 20 may include removable absorbent pads.

In an important aspect, the absorbent garment 20 may be produced to fit a variety of different size animals. In the aspect, the absorbent garment 20 has a width to length ratio of about 0.20 to about 0.35 where the width is measured from the narrowest part of the garment.

Bib Strap

Figure 4:
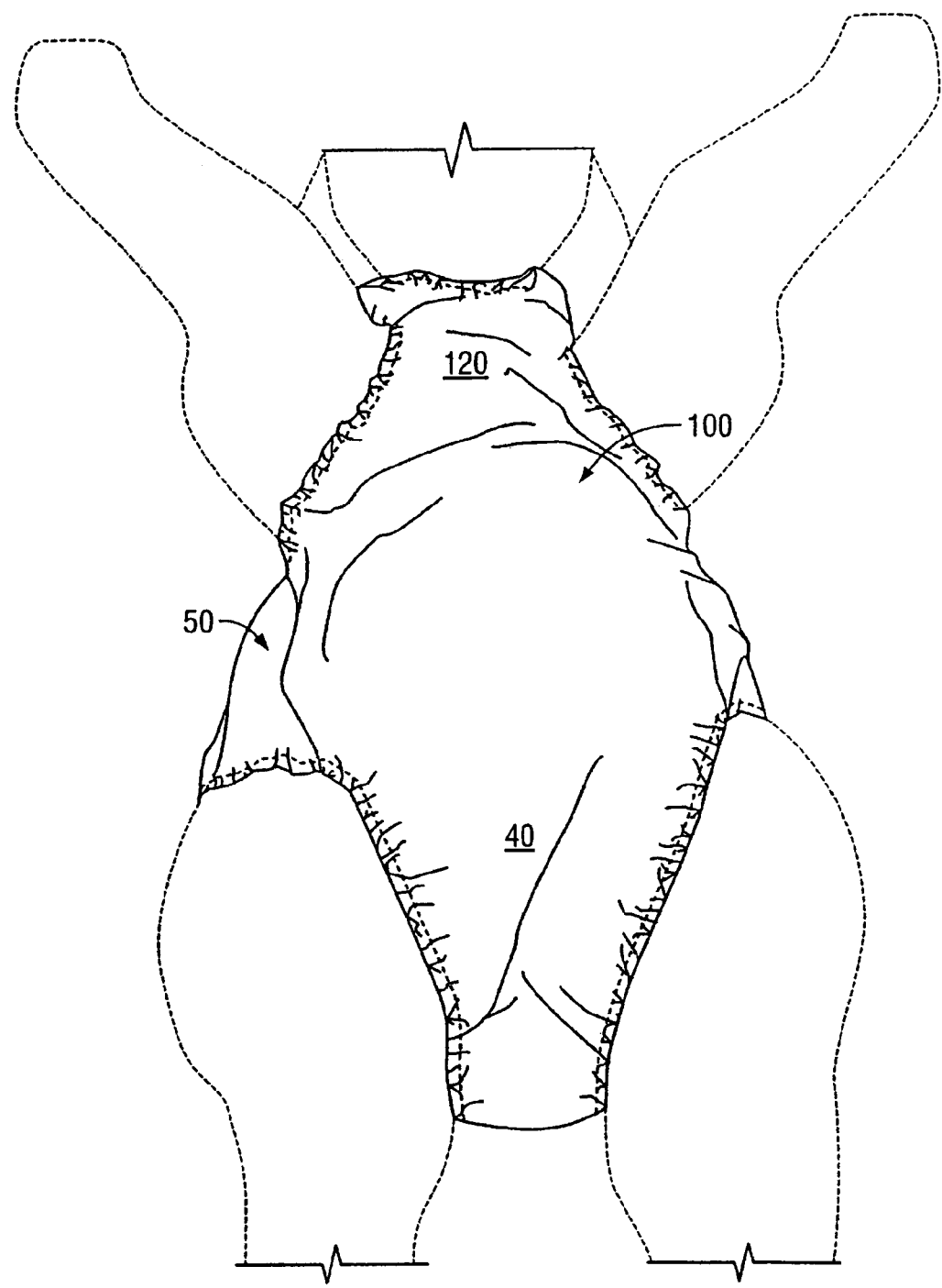
FIG. 4 is a bottom view of a dog wearing the pet garment.

As shown in FIGS. 1 and 2, the pet diaper garment 10 of the present invention includes a bib strap 110. The bib strap 110 includes a first single strap section 120 that is connected to the front section 40. In one embodiment, the first single strap section 120 may connect to the entire width of the front section 40 (FIG. 4). In an alternative aspect, a smaller portion of strap section 120 may be attached to a portion of the front section 40 which is less than the entire width of the front section. The single strap section 120 may be permanently attached to the front section 40 such as, for example, with stitching. Alternatively, the single strap 120 similarly may be removably attached to the front section 40, such as with, but not limited to, a Velcro strip, pin, snap, button, adhesive strips, or the like.

Figure 5:
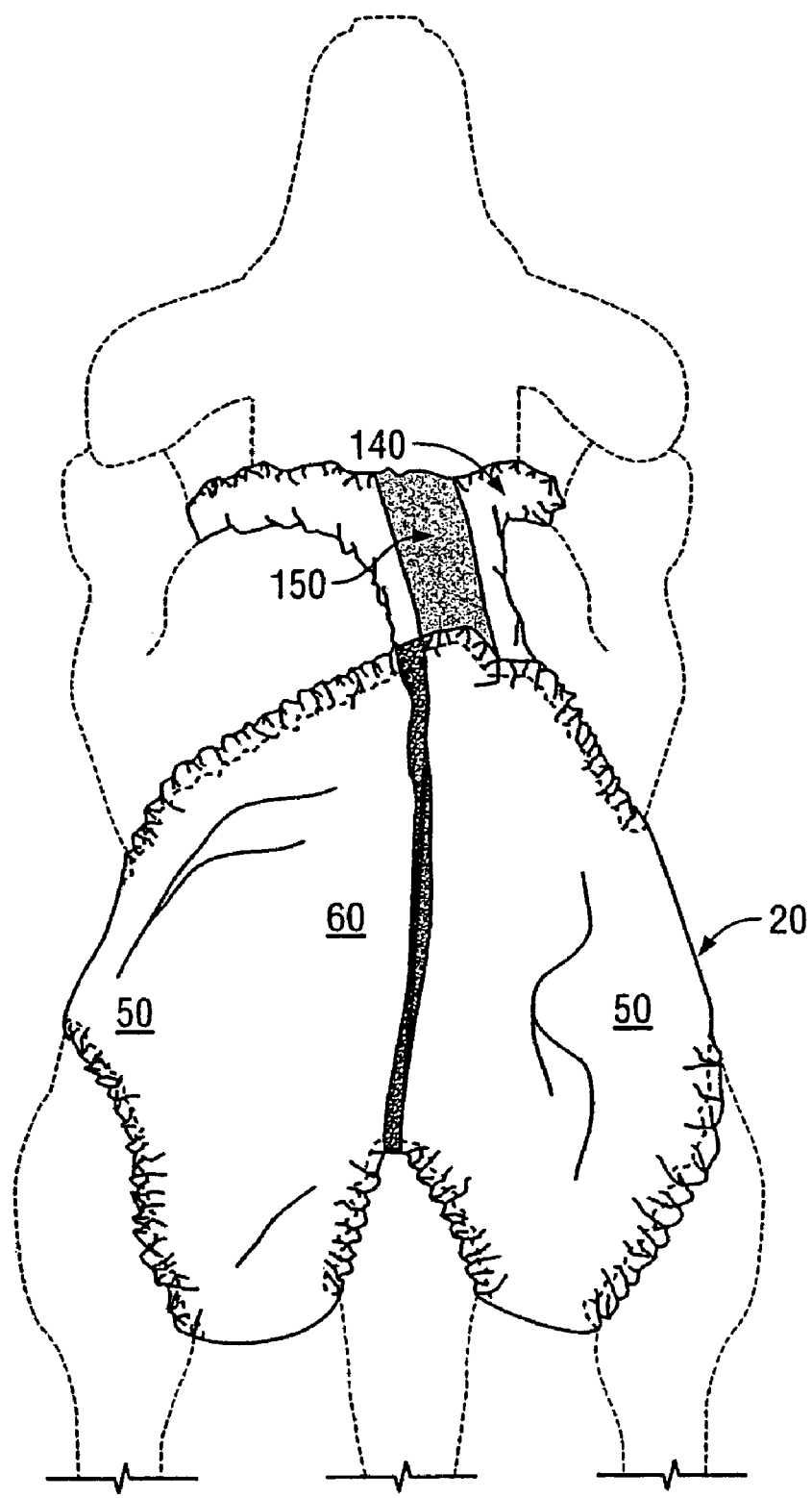
FIG. 5 is a top view of a dog wearing the pet garment.

The first single strap section 120 includes strap perforations 130. The perforations 130 allow the single strap section 120 to be separated into separate strap sections 140 or shoulder straps. In an alternative aspect of the invention shown in FIG. 2, the separate strap sections 140 or shoulder straps may rejoin to form a second single strap section 150 and define head opening 160. As shown in FIG. 5, the single strap section 150 may be permanently attached to the absorbent garment 20, such as with stitching, or reversibly attached with a connector. The connector may be any type of connector known in the art, such as, but not limited to, a Velcro strip, pin, snap, button, adhesive strips, or the like.

Figure 7:
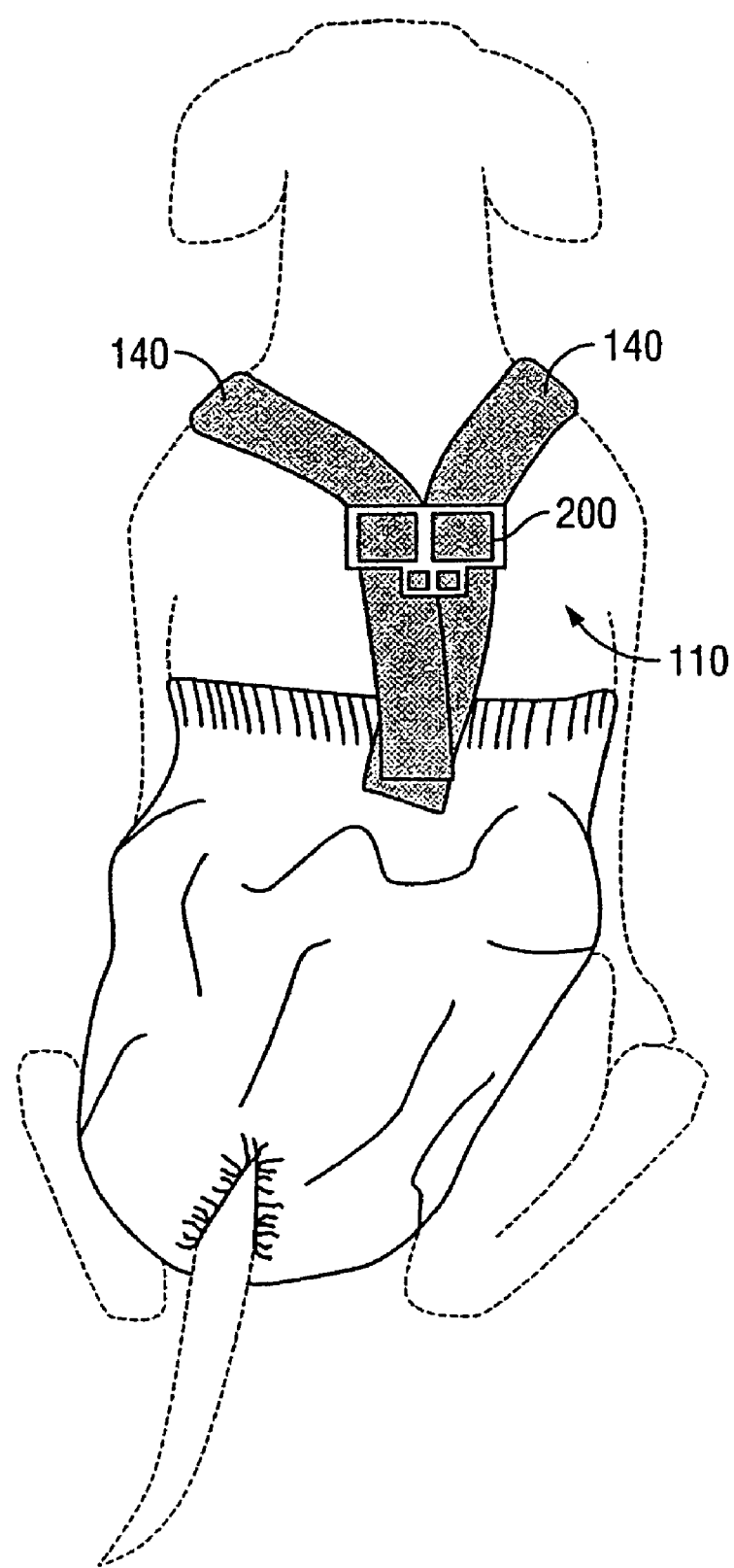
FIG. 7 is a back view of a dog wearing the pet garment.

As shown in FIG. 7, the shoulder straps 140 of the bib strap 110 may rejoin at a connector 200 on the back torso of the animal and extend to connect to the absorbent garment 20. The connector 200 may be any type of connector known in the art, such as, but not limited to, a Velcro strip, pin, snap, button, bands or the like. The connector 200 holds the shoulder straps 140 securely in place on the animal. In this aspect, connectors may be placed on both the fron and back of the animal to secure the straps.

Figure 13:
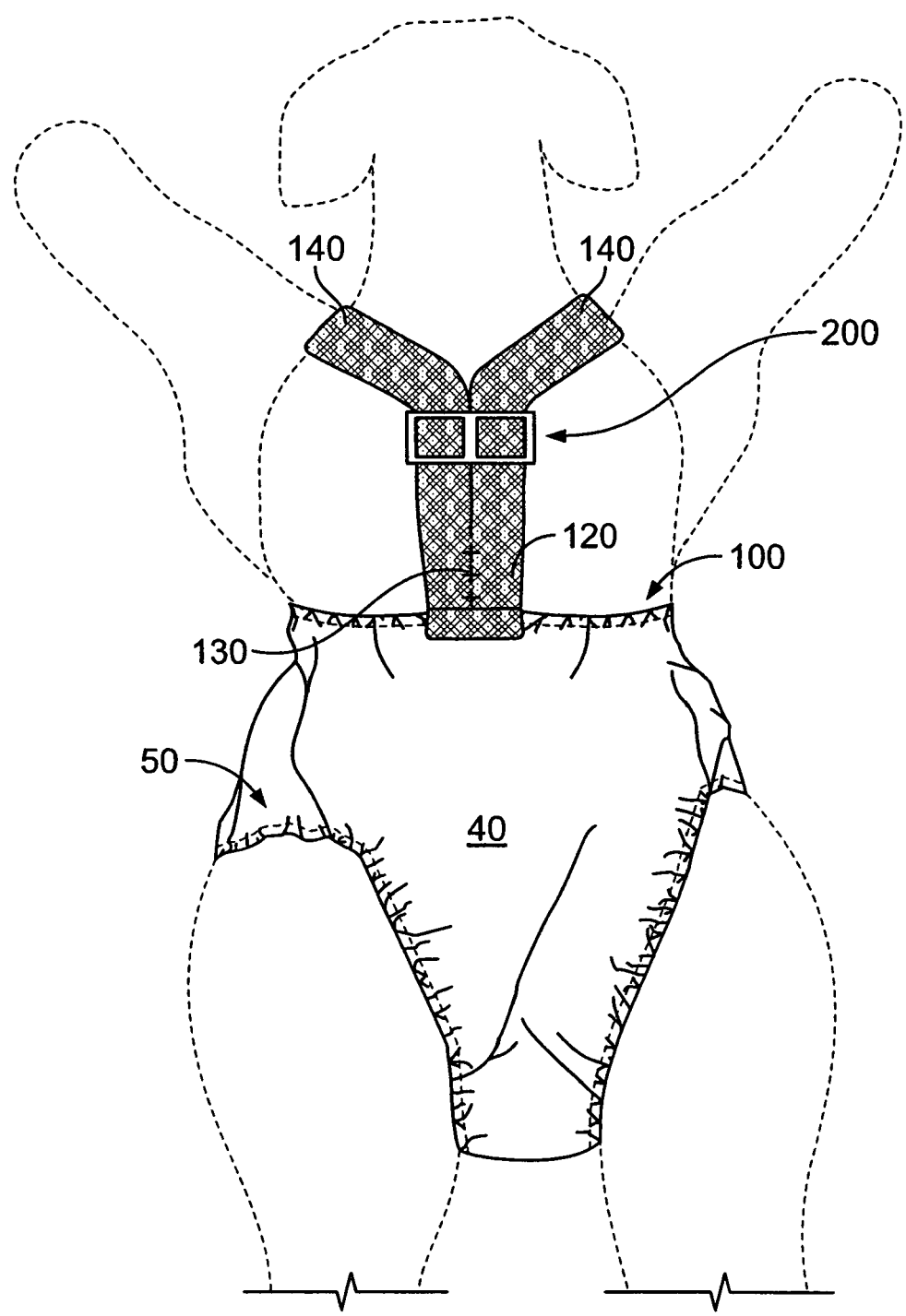
FIG. 13 illustrates a front view of the pet garment.

In another aspect of the invention as shown in FIG. 13, the shoulder straps 140 of the bib strap 110 may rejoin at a connector 200 on the upper front torso of the animal. Preferably, the shoulder straps 140 of the bib strap 110 rejoin at a connector 200 on the upper front torso or the upper back torso of the animal. More preferably, the shoulder straps 140 of the bib strap 110 rejoin at a connector 200 on the upper front torso of the animal, and, as shown in FIG. 7, rejoin again at a connector 200 on the back torso of the animal thus forming and defining head opening 160. In another aspect of the invention, a plurality of connectors may be used as needed to hold the shoulder straps securely in the place on the animal. In this aspect, the connector, such as for example a Velcro strip, may be placed both on the front and the animal to secure the straps.

Figure 11:
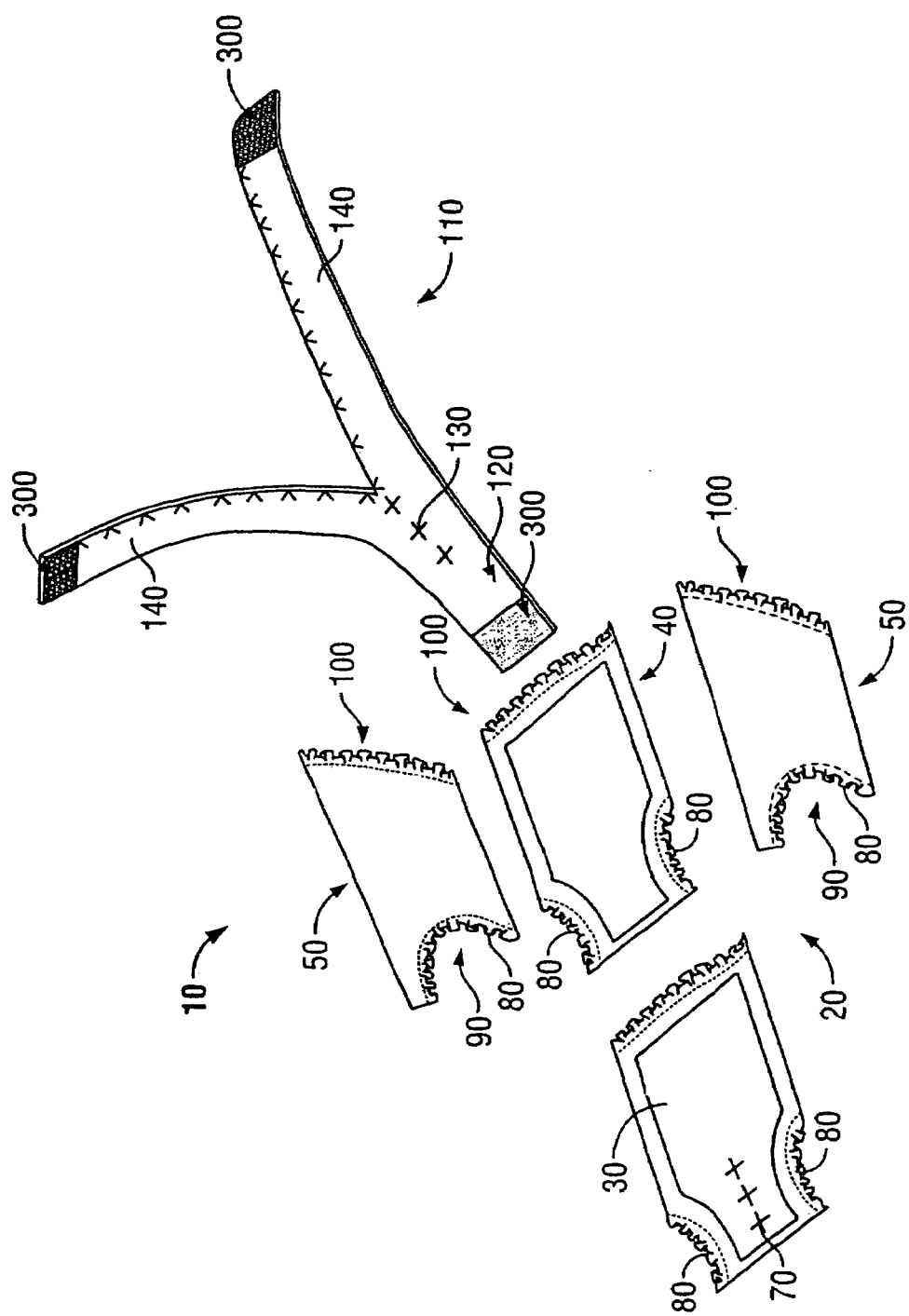
FIG. 11 shows component parts of the pet garment.
Figure 12:
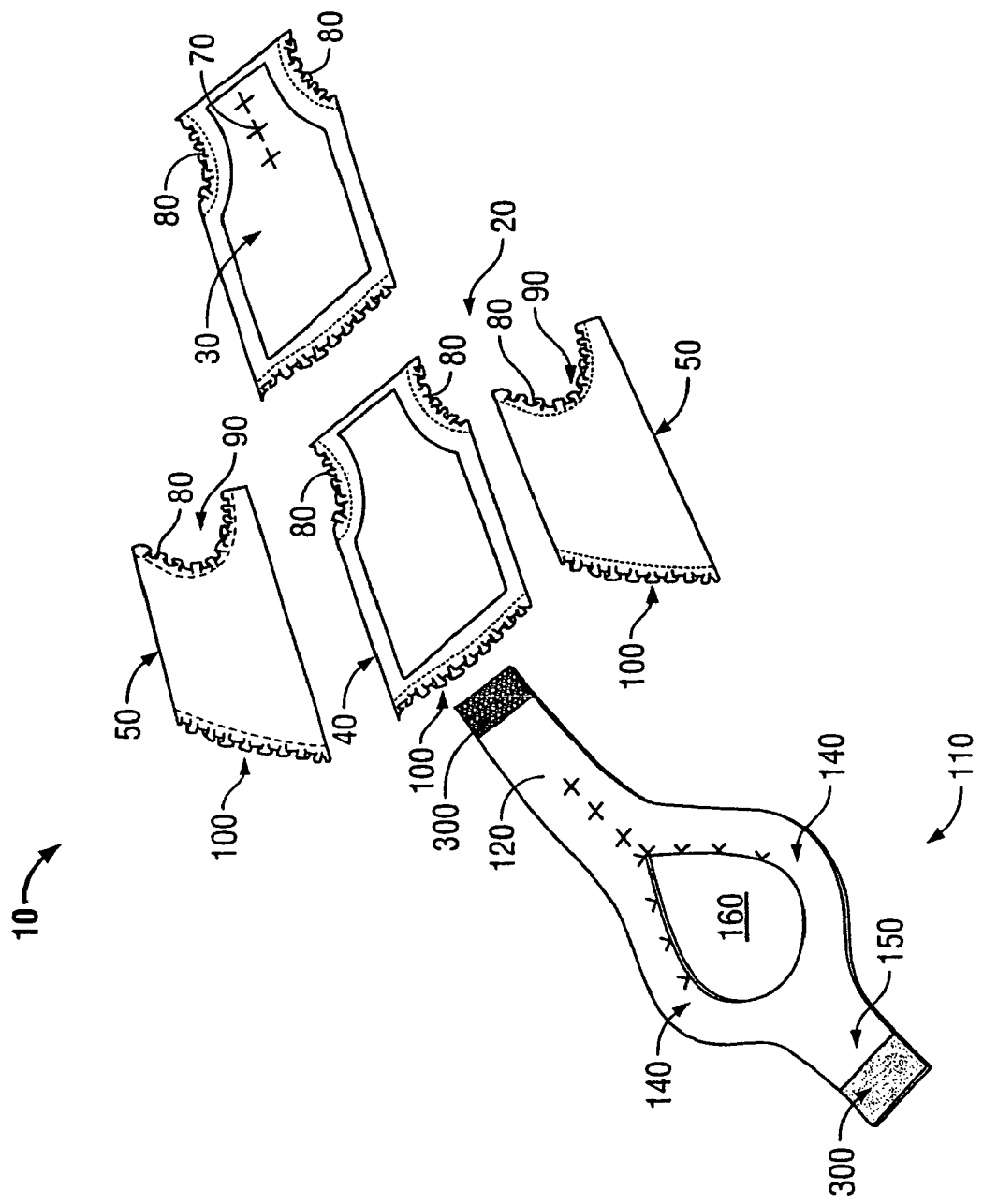
FIG. 12 shows component parts of the pet garment.

In an alternative aspect shown in FIG. 12, the bib strap 110 may be reversibly attached or connected to the absorbent garment 20. The bib strap 110 may be reversibly connected through a reversible connector 300. Any type of connector known in the art may be used. One example of a reversible connector 300 is a Velcro-type connector which allows the bib strap 110 to be connected, adjusted, and subsequently removed from the absorbent garment 20. The type of bib strap 110 utilized may be the type shown in FIG. 11 and could also be the type of bib strap 110 shown in FIG. 12. The bib strap shown in FIG. 12 includes a head opening 160 and reversible connectors 300.

In one aspect, the bib strap 110 as shown in FIGS. 7, 11 and 12 may be secured to any part of the absorbent garment 20. The absorbent garment 20 may include a hook and loop type fasteners over its entire surface or a portion of its surface such that a bib strap can be attached, adjusted and secured anywhere on the absorbent garment.

Leg Openings

Figure 8:
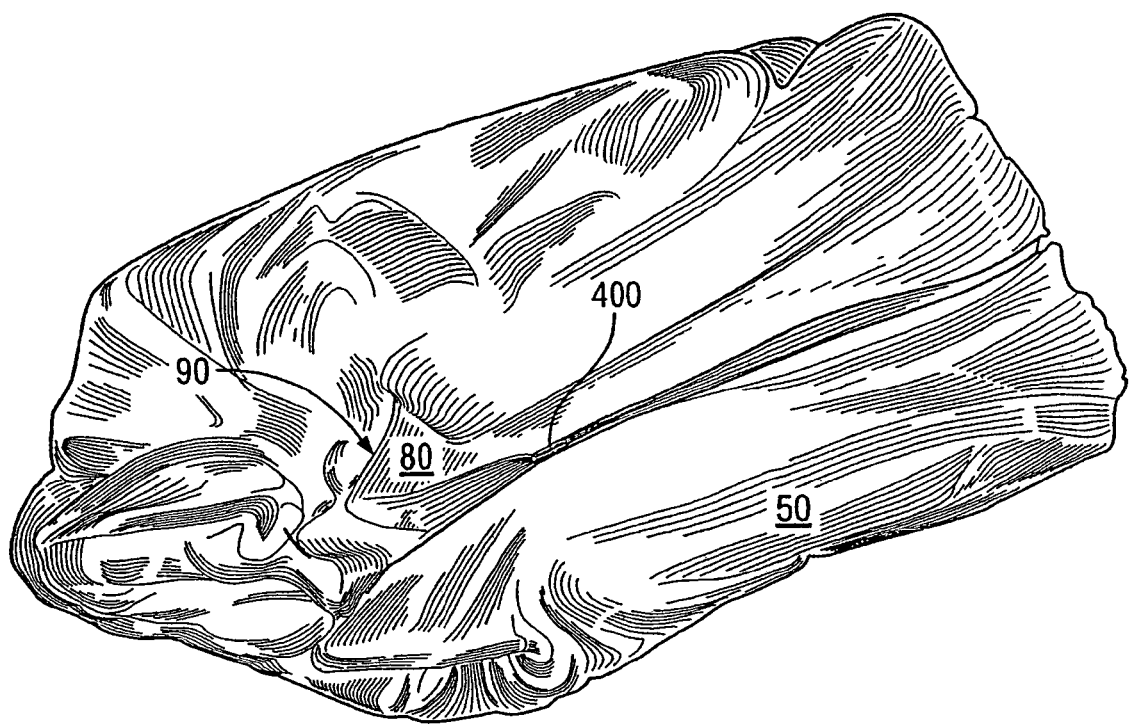
FIG. 8 is a side view of the absorbent garment with a closed snap closure.
Figure 9:
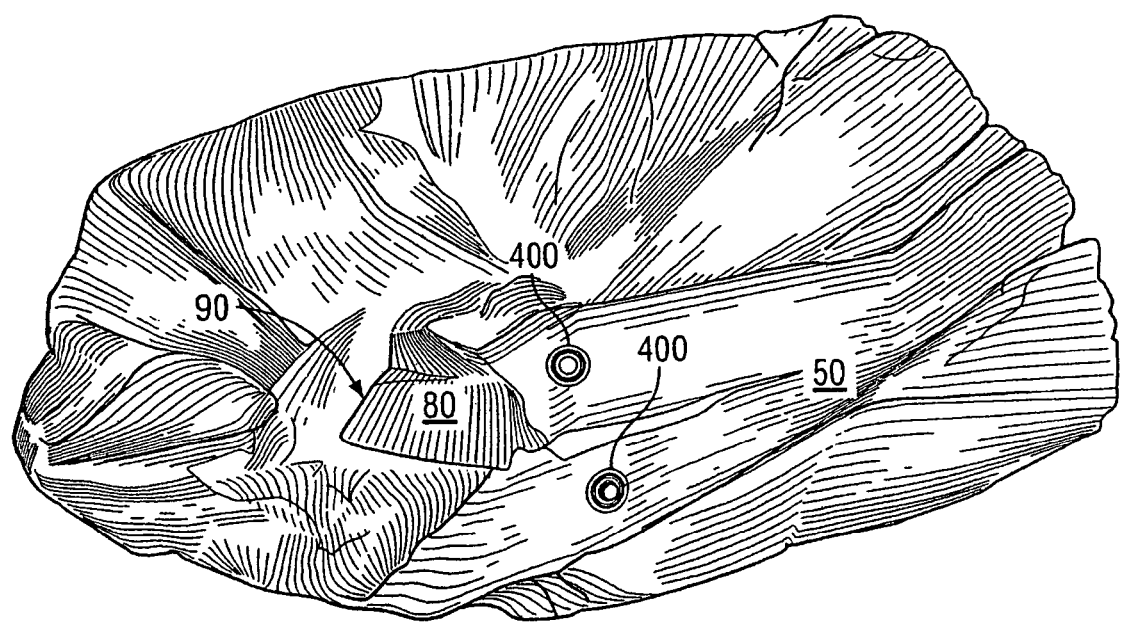
FIG. 9 is a side view of the absorbent garment with an open snap closure.

In one aspect of the invention, the absorbent garment 20 may be further secured around the animal's legs with a snap closure 400 (shown in FIGS. 8 and 9). The snaps closure 400 allows the garment to be securely fitted around the animal's leg.

Figure 14:
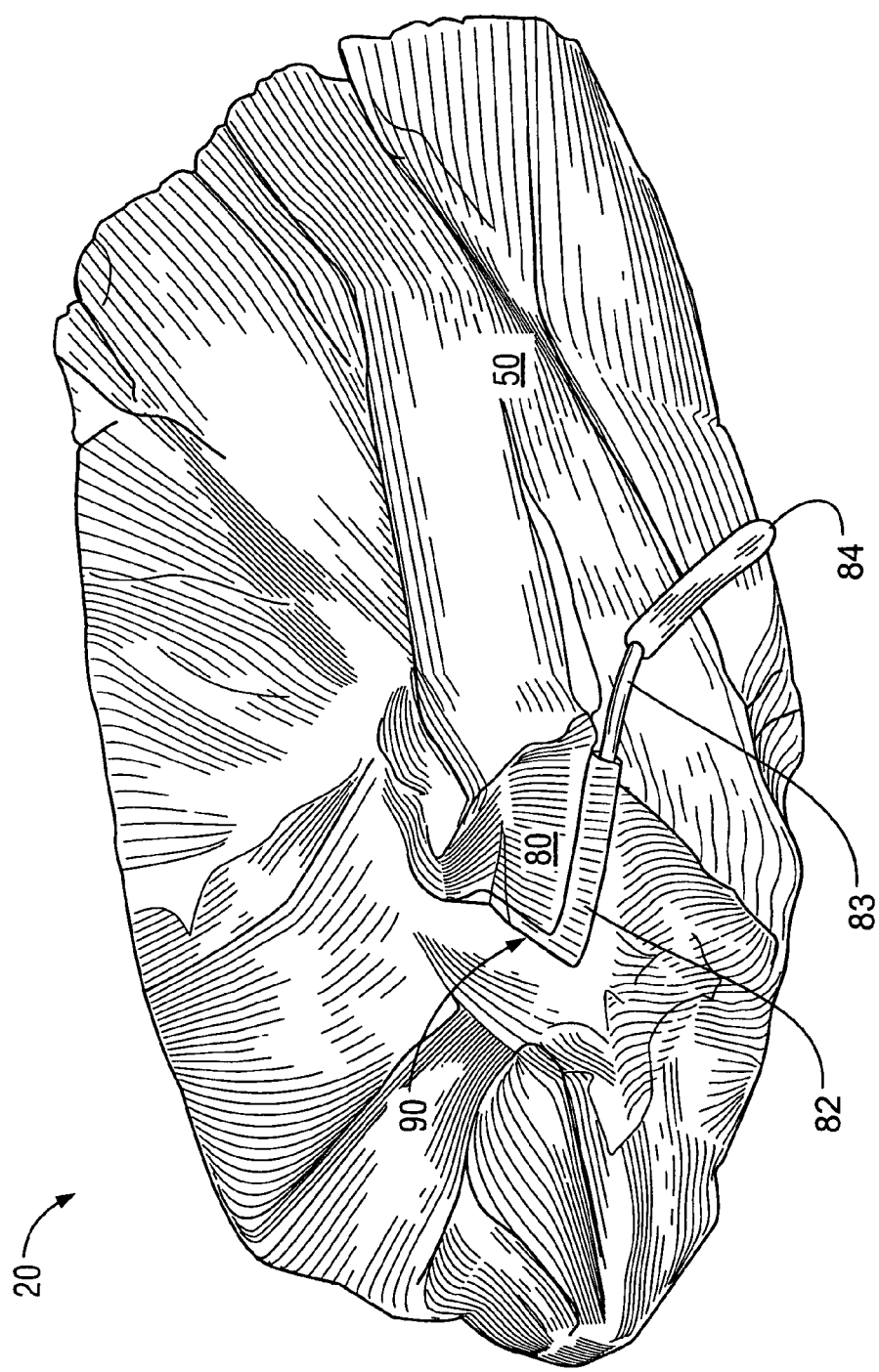
FIG. 14 shows the pet garment with a pull cord.

In an alternative embodiment as shown in FIG. 14, the leg openings 80 are defined by nonwoven fabric folded over and sewn together to form a casing or conduit 82 that is affixed to the absorbent garment 20. An elastic pull cord 83 is affixed at one end of the leg opening 80 to the absorbent garment 20, with the other side of the elastic pull cord 83 passing through the casing and exiting through a small opening in the absorbent garment 20. The elastic pull cord is then reversibly attached to the outer portion of the absorbent garment 20, such as for example, by a hook and loop fastener 84. The elastic pull cord 83 allows the user to customize the circumference of the leg opening 80 to securely fit the animal's legs and prevent waste leakage.

In another aspect, the absorbent garment may further include barrier cuffs. The barrier cuffs extend into the absorbent garment for distance effective for helping secure discharged waste in the absorbent garment. In this aspect, the barrier cuffs may extend into the absorbent garment from about one inch to about 4 inches, preferably about 2 to about 3.5 inches.

Tail Panel

Figure 15:
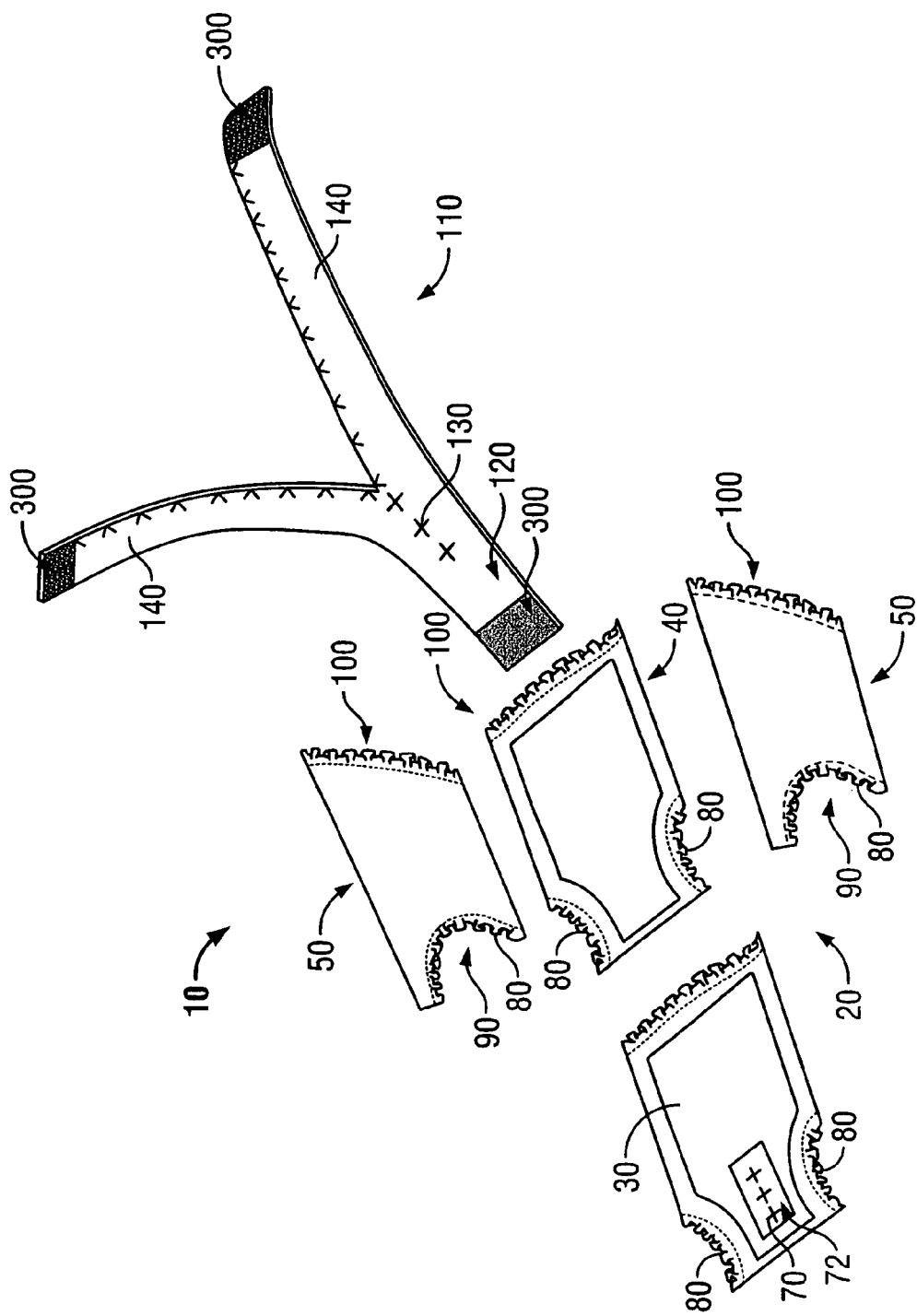
FIG. 15 illustrates the pet garment with a tail panel insert.

In an alternative aspect shown in FIG. 15, the back section 30 includes a tail panel insert 72 made of elastomeric nonwoven material. In one aspect of the invention, the tail panel insert is further defined by perforations 70. In another aspect, the tail panel has no perforations but the user can manually create a customized tail opening in the tail panel insert, such as by cutting with scissors. The size of the tail opening is easily customized to the width of the animal's tail. In this aspect, the elastomeric material has a stretch range of from about 125% to about 175%. Tail panels which are especially useful include those having a width to length ratio of about 10 to about 14.

In another aspect, the tail panel insert 72 may include a preformed opening that can be opened, closed and secured around the animal's tail with a connector. In an important aspect, the preformed opening in the tail panel insert 72 includes a hook and loop type reclosable fastener such Velcro.

Fabric

One fabric-like material that has been used successfully in prototypes of the invention and that possesses the requisite elasticity is understood to be referred to as DeMique (trademark of Kimberly-Clark Corporation, Neenah, Wis., for elastic nonwoven fabric) material or material that has been manufactured by a DeMique process. The secure fit of the diaper garment, without discomfort, is additionally aided through the use of circumferential elastic material 90 for the leg openings 80.

In one aspect of the invention, the straps are made of nonwoven fabric. In another aspect, the fabric used in the pet diaper garment may include a four-way stretch material. The four-way stretch material includes a tight-weave, four-way stretch fabric consists of about an eight (8) ounce tricot weave from about seventy-five (75) percent to about eighty-five (85) percent nylon fiber, and from about fifteen (15) percent to about twenty-five (25) percent segmented polyurethane fiber, such as spandex or elastane. This composition yields elasticity stretch factors of about ninety (90) to about one-hundred twenty (120) percent longitudinally, with a maximum stretch of about two-hundred twenty (220) percent, and about sixty (60) to about one-hundred (100) percent latitudinally, with a maximum stretch of about two-hundred (200) percent. In an alternative aspect of the invention, a polyester fiber may be substituted for the nylon fiber. The elasticity of the fabric allows the garment to be easily put on and removed from the animal, and allows the animal substantial freedom of movement. In an alternative aspect of the invention, the protective garment may include a weave such as Raschel with the percentages of the other materials remaining the same.

Connectors

In another important aspect of the invention, the garment closes with fasteners, for example, hook and loop fasteners like the fasteners sold under the trademark "Velcro". As shown in FIG. 7 and FIG. 13, the shoulder straps 140 of the bib strap 110 may be adjustably joined with one or more connectors 200. In an important aspect, the connectors are strips of Velcro which can be looped around the straps and connected to themselves. Preferably, the shoulder straps 140 of the bib strap 110 are adjustably joined with a connector 200 on the front torso or on the back torso of the animal. More preferably, the shoulder straps 140 of the bib strap 110 are adjustably joined with one or more connectors 200 on the front torso and one or more connectors 200 on the back torso of the animal, The connector 200 may be any connector known in the art for the purpose of joining or restraining straps, such as for example suspender straps and S-shaped straps. In another aspect of the invention, the straps may be secured to the absorbent garment with pins, buttons, snaps, Velcro adhesive strips or combinations thereof.

Use of the Pet Diaper Garment

The pet diaper in the present invention may be provided in several different size categories, such as small, medium and large. Within those general size categories, the garment may be further customized to securely and comfortably fit an animal within those size categories. The design of the pet diaper garment allows it to be easily and conveniently put on and taken off of the animal.

The pet diaper garment is placed onto the animal by encircling the absorbent garment 20 around the torso of the animal. The animal's legs are placed through leg openings 80 and a customized tail opening is made in the back section 30. In one embodiment, the tail opening may be made manually by cutting a hole in the back section 30. In another embodiment, the tail opening may be made by opening perforations 70 in the back section 30 or tail panel 72. The animal's tail may then be inserted through the customized tail opening made in the back section 30 or tail panel 72. In an embodiment that includes a tail panel 72, the elastic non-woven material of the tail panel 72 creates a comfortable but snug fit around the tail of the animal, thus preventing the escape of waste.

In an important aspect of this invention, the absorbent garment 20 is positioned around the animal's waist. The positioning of the absorbent garment 20 around the animal's waist is important to the comfort of the animal and to preventing waste leakage, particularly for male animals.

In an alternative aspect where the absorbent garment 20 opens along the back section, the absorbent garment 20 is secured around the animal's torso. The absorbent garment is also positioned around the tail and then secured along the top of the garment.

Once the absorbent garment 20 has been placed on the animal, shoulder straps 140 of the bib strap 110 may be extended along the animal's chest, positioned around either side of the animal's head and neck, extended along the animal's back to connect with the absorbent garment 20. In one aspect of the invention, a connector 200 on the animal's front or back torso joins bib straps 110 to hold bib straps 110 in place. In an alternative aspect of the invention, one or more connectors 200 join bib straps 110 on the animal's front torso, and an additional one or more connectors 200 join bib straps 110 on the animals back torso, thus forming and defining head opening 160. The shoulder straps 140 secure the absorbent garment 20 to the animal's body preventing the absorbent garment 20 from sagging and sliding off the animal, particularly when the absorbent garment 20 is weighted down with waste material.

The absorbent garment 20 may be removed from the animal by removing the connectors 200, bib straps 110 from the absorbent garment 20 and removing the absorbent garment 20 from the animal.

Conversion Kit

In another aspect, a method and conversion kit is provided that allows for the conversion of an existing human diaper into a pet diaper. The kit may include straps and connectors which are effective for attaching to a human baby diaper to allow for attachment to an animal.

Numerous modifications and variations in practice of the invention are expected to occur to those skilled in the art upon consideration of the foregoing detailed description of the invention. Consequently, such modifications and variations are intended to be included within the scope of the following claims.

What is claimed is:

1. A pet diaper garment comprising:
an absorbent garment encircling an animal's torso, the absorbent garment having a back section, a front section, and stretchable side sections which join to form a top section, the back section including perforations effective for allowing a user to locate and create a tail opening; and
a bib strap including perforations that allow the bib strap to be separated into two single strap sections which is separable into two strap sections, wherein each of said single strap section attached to any portion of the front section of the absorbent garment with hook and loop or button connectors, said bib strap extending around the front of the animal and connecting with any portion of a top section of the absorbent garment with hook and loop or down connectors.

2. The pet diaper garment of claim 1 wherein the absorbent garment includes a side section having a side opening.

3. The pet diaper garment of claim 1 wherein the absorbent garment includes leg openings securable with a snap closure.

4. The pet diaper garment of claim 1 wherein the bib strap is joined with a connector on the back torso of the animal.

5. The pet diaper garment of claim 1 wherein the bib strap is joined with a connector on the front torso of the animal.

6. The pet diaper garment of claim 1 wherein the absorbent garment includes leg openings comprising a folded section of fabric forming a casing, wherein the casing contains an elastic pull cord, and wherein the elastic pull cord is reversibly attached to the outer portion of the absorbent garment.

* * * * *